(12) United States Patent
Needham et al.

(10) Patent No.: US 10,572,839 B2
(45) Date of Patent: Feb. 25, 2020

(54) TOOL EXPERIENCE AGGREGATOR

(71) Applicant: Intel Corporation, Santa Clara, CA (US)

(72) Inventors: Bradford H. Needham, North Plains, OR (US); David A. Sandage, Forest Grove, OR (US); K. Sridharan, San Jose, CA (US); Bernard N. Keany, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 847 days.

(21) Appl. No.: 15/201,203

(22) Filed: Jul. 1, 2016

(65) Prior Publication Data

US 2018/0005154 A1    Jan. 4, 2018

(51) Int. Cl.
*G06Q 10/06* (2012.01)
*G06Q 30/02* (2012.01)

(52) U.S. Cl.
CPC ... *G06Q 10/06311* (2013.01); *G06Q 30/0206* (2013.01)

(58) Field of Classification Search
CPC .............................. G06Q 10/00; G06Q 40/06
USPC ...................................................... 705/7.29
See application file for complete search history.

(56) References Cited

U.S. PATENT DOCUMENTS

| | | | |
|---|---|---|---|
| 5,499,294 A | 3/1996 | Friedman | |
| 5,862,218 A * | 1/1999 | Steinberg | G06T 1/0028 348/231.3 |
| 6,359,837 B1 | 3/2002 | Tsukamoto | |
| 6,433,818 B1 | 8/2002 | Steinberg et al. | |
| 6,567,119 B1 | 5/2003 | Parulski et al. | |
| 6,587,949 B1 | 7/2003 | Steinberg | |
| 8,321,499 B2 * | 11/2012 | Reisman | G06F 8/65 709/203 |
| 8,635,272 B2 * | 1/2014 | Reisman | G06F 8/65 709/203 |
| 8,812,620 B2 * | 8/2014 | Reisman | G06F 8/65 709/218 |
| 8,825,872 B2 * | 9/2014 | Reisman | G06F 8/65 709/227 |
| 2002/0001395 A1 | 1/2002 | Davis et al. | |
| 2003/0081950 A1 | 5/2003 | Gennetten et al. | |
| 2004/0201751 A1 | 10/2004 | Bell et al. | |
| 2004/0236607 A1 * | 11/2004 | Kost | G06Q 10/10 705/2 |
| 2006/0041484 A1 * | 2/2006 | King | G06F 17/243 705/26.81 |

(Continued)

*Primary Examiner* — Romain Jeanty
(74) *Attorney, Agent, or Firm* — Schwegman Lundberg & Woessner, P.A.

(57) ABSTRACT

Various examples are directed to systems and methods for aggregating user tool experience. A record ingestion circuit may receive action record data from a user tool that describes an action performed with the user tool by the user. The record ingestion circuit may also receive user name data describing the user. A record analytics circuit may generate user experience data for the user describing a plurality of actions performed by the user with the user tool. An application programming interface (API) circuit may receive from a requesting application a query for data describing the plurality of actions and send to the requesting application the data describing the plurality of actions.

24 Claims, 9 Drawing Sheets

(56) References Cited

U.S. PATENT DOCUMENTS

| | | | | |
|---|---|---|---|---|
| 2010/0185538 A1* | 7/2010 | King | ................... | G06Q 30/04 |
| | | | | 705/34 |
| 2011/0289009 A1* | 11/2011 | Rankin, Jr. | ............ | G06Q 10/10 |
| | | | | 705/313 |
| 2012/0310717 A1* | 12/2012 | Kankainen | ............. | G06Q 30/02 |
| | | | | 705/14.4 |
| 2013/0332355 A1* | 12/2013 | Atsmon | ................. | G06F 21/34 |
| | | | | 705/41 |
| 2014/0040059 A1* | 2/2014 | Barabas | ............. | G06Q 30/0601 |
| | | | | 705/26.1 |
| 2014/0081871 A1* | 3/2014 | Kidron | ................. | G06F 15/167 |
| | | | | 705/59 |
| 2014/0236758 A1* | 8/2014 | King | ................... | G06F 17/243 |
| | | | | 705/26.8 |
| 2014/0279324 A1* | 9/2014 | King | ................... | G06Q 30/04 |
| | | | | 705/34 |

* cited by examiner

TOOL EXPERIENCE AGGREGATOR

TECHNICAL FIELD

Examples described herein generally relate to systems and methods for capturing, aggregating, and/or analyzing user experience with one or more tools.

BACKGROUND

Many types of services depend on a user's skill or experience with a particular type of tool, such as photography, machining, etc. The skill or experience level of any particular user, however, is often distributed with word-of-mouth accounts or reviews provided by those who have directly experienced the user's work.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which.

DETAILED DESCRIPTION

Figure 1:
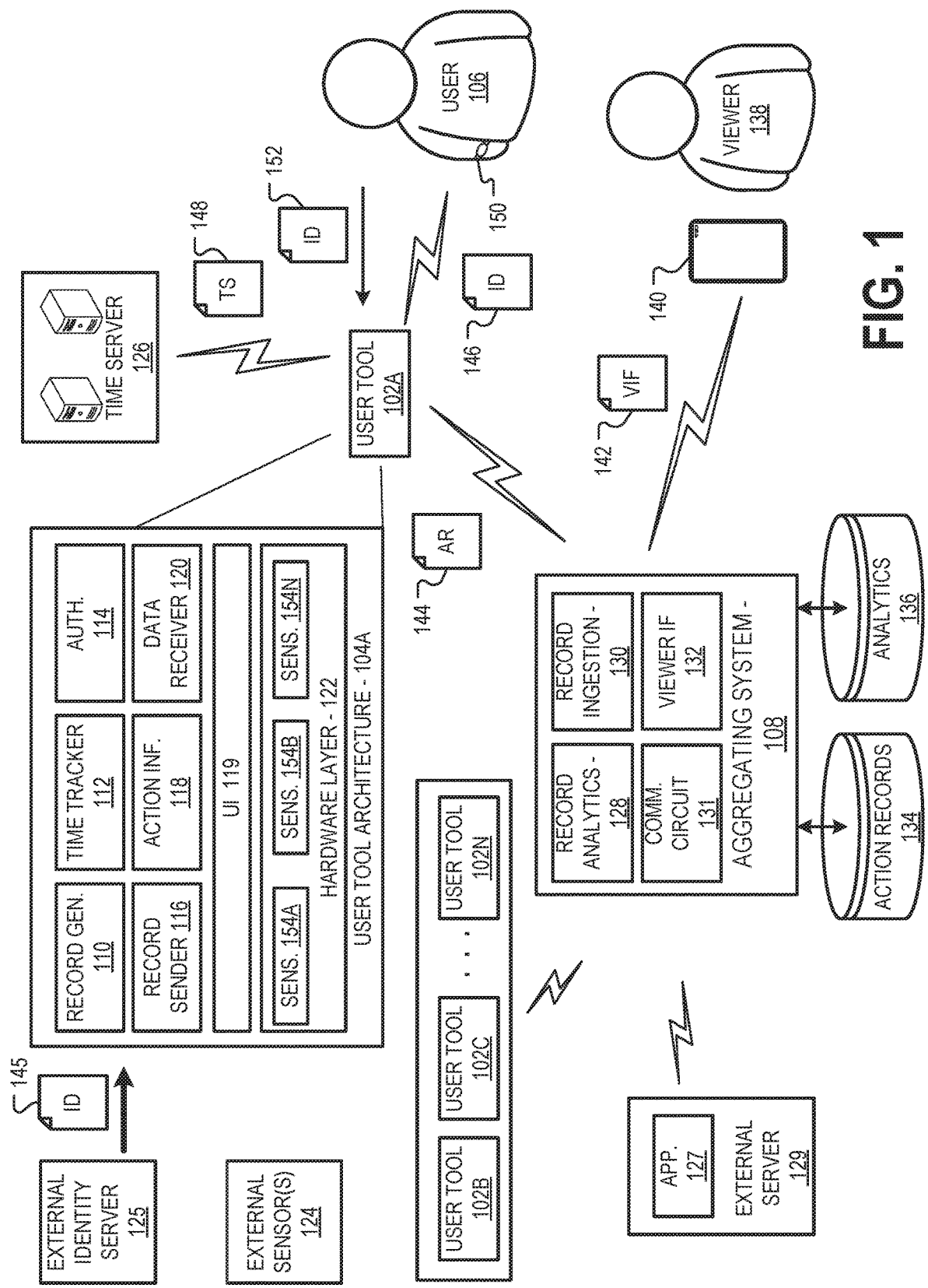
FIG. 1 is a diagram showing one example of an environment for aggregating tool experience data.

In the following description, for purposes of explanation, numerous specific details are set forth in order to provide a thorough understanding of some examples. It will be evident, however, to one skilled in the art that the present disclosure may be practiced without these specific details.

Various examples described herein are directed to systems and methods for aggregating and distributing user experience data describing the experience and/or skill of one or more users with a user tool, such as a camera, a lathe, a musical instrument, or any other sort of tool with which a user's experience and/or skill may be objectively measured. The user tool may be programmed to generate action record data describing actions taken by the user with the user tool. Action record data may describe the number of actions taken by the user with the user tool. Optionally, action record data may describe parameters of the user's actions taken with the user tool such as, for example, a type of material worked with a lathe, lighting conditions for a photograph, etc. Also, optionally, the action record data may include result data describing the result of the action. The result of the action may include a measure of the quality of the action. For example, result data may include an image of a piece worked by the lathe, a photograph taken by a camera, output of a quality testing system on a lathe indicating a maximum irregularity of a cut or hole, output of an analysis of a photograph performed at the camera, etc.

The user tool may be in communication with an aggregating system. The aggregating system receives action record data from one or more user tools used by one or more users. The aggregating system generates user experience data describing the experience of one or more users on a user tool. For example, the aggregating system may generate aggregated user experience data describing the experience of multiple users. User experience data may describe a quantity of actions that the user has taken with a particular user tool (e.g., a number of photographs taken with a camera, a number of hours spent on a lathe, a number of miles driven in a truck, etc.). In some examples, user experience data also indicates the user's experience under specific conditions of use such as, for example, material worked on a lathe, lighting conditions when a photograph is taken, etc. Optionally, the aggregating system also generates user skill data. User skill data describes the quality of the user's action with the user tool, such as, for example, the clarity of a photograph, the precision of a machined work piece, etc.

In some examples, the aggregating system also performs analytics on action record data. For example, the aggregating system may be programmed to rank users based on experience with a particular user tool, quality of output with a particular tool, or any other suitable parameter. The aggregating system may respond to queries from a viewer using a viewer computing device. In response to a query, the aggregating system may generate and serve viewer user interface describing the user experience and/or skill with one or more user tools.

To give an illustration, in some examples, the user tool is a camera. User actions taken with a camera may include, taking a photograph, recording a video, etc. The user authenticates him or herself to the camera, for example, by providing a user name and/or password, providing biometric data, or any other suitable identifying data. The camera includes a shutter sensor or other sensor suitable for detecting when a photograph or video is taken. The camera may be programmed to generate action record data describing photographs or videos taken with the camera. The action record data may indicate a number of photographs and/or videos taken by the user. In some examples, the action record data includes additional data describing aspects of the photographs or videos taken by the user. For example, the camera may include additional sensors that capture data regarding a photograph or video such as, a shutter speed sensor that senses a shutter speed, a range finder sensor that senses a distance from the camera to a subject of a photograph, a photo sensor that senses ambient light conditions, etc. Also, in some examples, action record data may include the captured photographs and/or videos themselves. The camera sends the action record data to the aggregating system, which may determine user experience data and, optionally, user skill data.

FIG. 1 is a diagram showing one example of an environment 100 for aggregating tool experience data. The environment 100 includes a user tool 102a. The user tool 102a is shown with an associated user 106, who may use the tool as described herein. Additional user tools 102b, 102c, 102n are shown, and any suitable number of user tools 102a, 102h, 102c, 102n may be included in the environment 100. The user tools 102a, 102b, 102c, 102n may include any type of machine or apparatus employed by a user, for example, to provide a service. Examples of user tools 102a, 102b, 102c, 102n include cameras (used to provide photography), vehicles (used to provide transportation services), machine tools (used to provide machining services), wood working tools (used to provide wood working services), musical instruments (used to provide performances), etc. User tools of different types may include tools used to perform different actions (e.g., a camera versus a machine tool). User tools of different types may also include user tools for performing the same action in different ways (e.g., cameras with different lenses, machine tools with different bits, different models of various types of user tools, etc.). Although one user 106 is shown in FIG. 1, the environment 100 may include additional users. For example, the user tool 102a may sometimes be used by the user 106 and at other times be used by another user or users. Additionally user tools 102h, 102c, 102n may be used by the user 106 and/or by one or more different users.

The environment 100 also shows an example architecture 104 for the user tool 102a. Although one example of the architecture 104 is shown in FIG. 1, some or all of the user tools 102b, 102c, 102n may be configured according to the architecture 104 or a variation thereof. The architecture 104 may be integral to the user tool 102a and/or may be implemented as an add-on control circuit. The architecture 104 includes a hardware layer 122 and various circuits 110, 112, 114, 116, 118, 120. The hardware layer 122, in some examples, includes a processor and memory. For example, the hardware layer 122 may be configured according to one or more of the computing device architecture examples provided herein. The various circuits 110, 112, 114, 116, 118, 120 may be implemented with dedicated hardware (e.g., field programmable gate arrays (FPGAs), logic gates, etc.) or may be implemented as software instructions executed at the hardware layer 122.

The hardware layer 122 is shown to include sensors 154a, 154b, 154n. The sensors 154a, 154b, 154n may be configured and positioned to sense the user's actions taken with the user tool 102a. The type and position of sensors 154a, 154b, 154n may depend the type of the user tool 102a. For example, if the user tool 102a is a camera, sensors 154a, 154b, 154n may include a shutter speed sensor, a subject range sensor, a lens type sensor, etc. if the user tool 102a is a truck, sensors 154a may include, a speedometer, a brake sensor, etc. in some examples, one or more of the sensors 154a, 154b, 154n may be positioned to sense the position and/or use of safety equipment or other safety feature of the user tool 102a. For example, if the user tool 102a is a table saw, a sensor may sense whether the safety fence is installed. The sensors 154a, 154b, 154n, in some examples, are integral to the user tool 102a. For example, the sensors 154a, 154b, 154n may be physically coupled to the user tool 102a. Some or all of the sensors 154a, 154b, 154n may also be configured to perform functions at the user tool 102a in addition to capturing user action data, as described herein.

An optional external sensor 124 is also shown in the environment 100. The external sensor 124 may be in communication with the user tool 102a in any suitable manner, for example, via a short range communication medium. A short range communication medium may be a wireless medium that enables communication between devices that are near to one another (e.g., devices within 10 meters of one another, devices with a line-of-sight path there between, etc.) Examples of short range communication mediums include near field communication (NFC), Bluetooth®, Bluetooth LE™, etc. The external sensor 124 may sense a condition associated with the use of the user tool 102a. For example, when the user tool 102a is a machine tool, the external sensor 124 may be associated with a work piece clamp and may provide a signal to the user tool 102a indicating whether the work piece is properly clamped. In some examples, an external sensor 124 may be positioned to sense the status of a piece of safety equipment for use with the user tool 102a. Returning to the example where the user tool is a machine tool, for example, the external sensor 124 may be positioned on a pair of safety glasses and may be positioned to provide a signal indicating whether the user 106 is wearing the safety glasses.

An authentication circuit 114 may be programmed to authenticate the user 106. In this way, the user tool 102a may verify that action record data generated from the sensors 154a, 154b, 154n, 124 describes actions performed by the user 106 (and not actions that are performed by another user). The authentication circuit 114 receives user identity data 145, 146 and/or 152 and verifies the user identity data 145, 146 and/or 152. The authentication circuit 114 may verify user identity data 145, 146, 152 in any suitable manner, for example, as described herein.

User identity data 152 may be received directly from the user 106. User identity data 152 may include, for example, a user name, a user password, a personal identification number (PIN), biometric data, or any other data describing the user 106. User identity data 152 may be entered to the user tool 102a directly by the user 106, for example, via a keypad, biometric sensor, or other input/output (I/O) device of the user tool 102a. A biometric sensor may be any sensor that captures a biometric response of the user 106, such as an optical, ultrasonic, capacitive, or other suitable fingerprint sensor, an electrode pair for capturing an electrocardiogram, an image sensor for capturing a retinal scan, a microphone for capturing a heartbeat, breathing rate or voice sample, etc.

User identity data 146 may be received from a user computing device 150. The user computing device 150 may be any computing device suitable for capturing and providing the user identity data 146 to the user tool 102a. In some examples, the user computing device 150 is a wearable computing device such as, for example, the Nymi Band™ device available from Nymi™ The user computing device 150 may comprise one or more I/O devices and/or biometric sensors for receiving the user identity data 146 from the user. The user computing device 150 may, in turn, provide the user identity data 146 to the user tool 102a (e.g., the authentication circuit 114). The user computing device 150 may send the user identity data 146 to the user tool 102a, for example, upon receiving a request for the user identity data 146 from the user tool 102a.

User identity data 145 may be received from an external identity server 125. In some examples, the external identity server includes or is in communication with a real time location system (RTLS) or other suitable system for tracking the location of users 106 on a factory floor or other suitable workspace for use of the user tool 102a. For example, external identity server 125 may be in communication with one or more cameras or other sensors to detect and identify users, including the users 106. Any suitable sensing technique may be used including, for example, voice recognition (from a microphone), face recognition (from a camera), etc. The external identity server 125 may match a detected location of the user 106 to the location of the user tool 102*a*. In some examples, the external identity server 125 may be in communication with the user computing device 150 and may receive user identity data 146 from the user computing device 150 to authenticate the user 106 and track his or her location.

The authentication circuit 114 may verify user identity data 145, 146, and/or 152 in any suitable manner. In some examples, the user tool 102*a* may verify user identity data by initiating the sending of a message (e.g., an email, short message service (SMS) or other suitable message) to the user computing device 150. The message may be sent by the authentication circuit 114, although in some examples, the authentication circuit 114 may request that the message be sent by a third party server. The message may include a secure hyperlink. When the message is received at the user computing device 150, the user 106 may select the hyperlink, which may direct the user to a log-in page or other authentication mechanism of a third party server, such as those available from Google, Inc. and Facebook, Inc. In some examples, the authentication circuit 114 and/or the third party server, may compare user identity data 145, 146, and/or 152 with reference identity data. For example, biometric data may be compared to reference biometric data previously captured from the user 106 to determine whether a match exists.

The example user tool architecture 104 for the user tool 102*a* also includes a data receiver circuit 120 programmed to receive data from the sensors 154*a*, 154*b*, 154*n*, 124. An optional action inference circuit 118 may analyze data received from the sensors 154*a*, 154*b*, 154*n*, 124 and detect actions taken by the user. For example, if the user tool 102*a* is a camera, and a shutter sensor indicates that the user 106 cycled the shutter, the action inference circuit 118 may determine that the user 106 has taken a photograph with the camera. In some examples, the inference circuit 118 may detect a user action with the user tool 102*a* in directly. For example, the user tool 102*a* may be a truck having a GPS sensor. The action inference circuit 118 may receive GPS sensor data indicating the truck's location. If the truck is stationary for a predetermined amount of time (e.g., two hours) the action inference circuit 118 may infer a beginning of a route for the truck. When the truck is again stationary for the predetermined amount of time, the inference circuit 118 may inter an end to the round. The complete route may be an action and the action inference circuit 118 may store sensor data regarding the action (e.g., GPS readings, speedometer readings, trip distance, etc.).

An optional record generator circuit 110 may generate action record data from the data received by the sensors 154*a*, 154*b*, 154*n*, 124. For example, when the action inference circuit 118 detects a user action, it may provide an indication of the user action to the record generator 110. The indication may include, for example, a time of the user action. The time may be a single time (e.g., the time that a photograph was taken) and/or a range of times (e.g., the time range of a trip with a truck). The record generator circuit 110 may gather sensor data from the sensors 154*a*, 154*b*, 154*n*, 124 captured at or near the time received from the action inference circuit 118 and consolidate the sensor data as action record data for the detected action. In some examples, the record generator circuit 110 may include result data in the action record data. Result data may describe the result of the action, for example, to measure the skill of the user 106 in performing the action. Result data may include, for example, a photograph from a camera, an image of a work piece generated by a machine tool, etc. In some examples, result data includes descriptions of the result of the action. For example, instead of including a complete photograph, result data may include analysis of the photograph performed at the user tool 102*a*.

In some examples, the user tool architecture 104 also includes a user UI 119. The user UI 119 may receive settings for the user tool 102*a* from the user 106. For example, where the user tool 102*a* is a camera, the user UI 119 may receive a shutter speed, exposure setting, etc. In an example where the user tool 102*a* is a lathe, the UI 119 may receive an indication of an installed bit, etc. Tool setting data received through the UI 119 may be part of the action record data generated by the record generator circuit 110.

An optional time tracker circuit 112 may match data received from the sensors 154*a*, 154*b*, 154*n*, 124 with a timestamp 148 received from a time server system 126. The time server system 126 may provide a trusted timestamp 148 that may be affixed to data received from the sensors 154*a*, 154*b*, 154*n*, 124 to indicate the time of capture. In some examples, the time server system 126 is a network time protocol (NIP) server. The time tracker circuit 112 may append timestamp data to sensor data in any suitable manner. For example, the time tracker circuit may generate timestamped sensor data that includes sensor data and the timestamp data indicating when the sensor data was received at the user tool 102*a*. In some examples, the time tracker circuit 112 may cryptographically sign a combination of sensor data and timestamp data. A record sender circuit 116 may send action record data 144 to the aggregating system via any suitable medium. In some examples, the action inference circuit 118 and record generator 110 may be omitted.

Like the architecture 104, the aggregating system 108 may comprise various circuit 128, 130, 132. These circuits may be implemented with dedicated hardware (e.g., field programmable gate arrays (FPGAs), logic gates, etc.) or may be implemented as software instructions executed by any suitable computing device or devices. A record ingestion circuit 130 is programmed to receive action record data 144 from the user tool 102*a*. In some examples, the record ingestion circuit 130 is programmed to receive action record data from additional user tools 102*b*, 102*c*, 102*n* as well. The record ingestion circuit 130 may be configured to authenticate data received from the user tool 102*a*. For example, the user tool 102*a* may cryptographically sign data sent to the aggregating system 108. The record ingestion circuit 130 may verify the cryptographic signature associated with the received data. In some examples, the record ingestion circuit 130 may also verify a cryptographic signature associated with one or more timestamps of the received data. The action record data received from the user tool 102*a* may include user name data indicating the user 106. The user name data may include the user identity data 145, 146, and/or 156 received by the user tool 102*a* from the user 106 and/or may include a name or other identifier of the user 106. In some examples, the user name data may include an indication that the user tool 102*a* has authenticated the user 106, for example, as described herein based on the user identity data 145, 146 and/or 152.

The aggregating system 108 may also comprise a record analytics circuit 128. The record analytics circuit 128 may receive action record data and generate user experience data and/or user skill data. User experience data, for example, may comprise an aggregation of action record data, as described herein. In some examples, user experience data may be delineated by specific conditions encountered by a user during an action. In an example where the user tool is a drill press, sensors 154*a*, 154*b*, 154*n*, 124 may include a strain gauge or other suitable sensor on an arm of the drill press to sense the stress placed on the arm by the user 106. The aggregating system 108 may categorize user actions with the user tool according to the amount of pressure required on the arm of the drill press.

The record analytics circuit 128 may also generate user skill data, for example, from result data that is received from the user tool 102*a* (e.g., as a component of the action record data). For example, result data may describe and/or measure a result of the user's action with the user tool 102*a* such as, for example, a photograph taken by a camera, a work piece generated by a machine tool, a recording of an instrument, etc. The record analytics circuit 128 may analyze the result data for an action and assign a skill level to the action. For example, when the user tool 102*a* is a camera, and the result data includes a photograph, assigning a skill level to the action may include detecting a sharpness of the photograph or other measure of quality. In an example where the user tool 102*a* is machine tool and the result data includes an image of the resulting work piece, assigning a skill level to the action may include comparing an actual shape of the work piece to an ideal shape of the work piece, detecting scoring or other imperfections on the work piece, etc. In an example where the user tool 102*a* is a musical instrument and the result data is a recording of the user 106 playing the instrument, assigning the skill level may include determining whether the user 106 sounded the correct notes at the correct time. In some examples, assigning a skill level to an action may occur at the user tool 102, which remove the necessity of sending photographs or other large and potentially proprietary files to the aggregation system 108.

In some examples, the record analytics circuit 128 may also generate aggregated user analytics data describing various qualities of users such as the user 106. Analytics data may be any data describing tool use of one or more users. For example, the record analytics circuit 128 may generate a ranking of users by experience on a particular user tool (e.g., the users with the most completed delivery routes of X miles or more, users with the most photographs taken, etc.). A user with the most or best experience may be the user with the highest number of completed actions. In some examples, the records analytics circuit 128 may generate a ranking of users by experience on a particular tool in particular conditions (e.g., a number of photographs taken in low light conditions or at a particular shutter speed, etc.). In some examples, the records analytics circuit 128 may generate a ranking of users based on skill data.

In another example, the record analytics circuit 128 may generate analytics data describing the user's safety record in actions with the user tool 102*a* (e.g., safety data). In some examples, the analytics circuit 128 generates a safety rating for the user 106 and/or a group of users from safety data. A safety rating may indicate how often the user 106 takes action with proper safety equipment and/or techniques. For example, a safety rating may describe the percentage of user actions taken with proper safety equipment and/or techniques.

In some examples, safety data may indicate a number of times that the user 106 used proper safety equipment while operating the user tool 102*a*. Also, in an example where the user tool 102*a* is a truck or other vehicle, the record analytics circuit 128 may receive data describing the speed limits on roads traversed by the vehicle during the action. Safety data may include a measure of how often the vehicle was at or below the speed limit. In some examples, the record analytics circuit 128 may determine price-to-experience or price-to-skill records or listing. For example, the record analytics circuit 128 may receive price data describing a price charged by the user 106 for actions performed with the user tool 102*a*, for example, from the user 106 or from another source. The record analytics circuit 128 may compare the user's price to an experience and/or skill rating to determine the price-to-experience or price-to-skill ratio. In some examples, the record analytics circuit 128 may generate a ranking of users by price-to-experience and/or price-to-skill ratio. Also, in some examples, the record analytics circuit 128 may determine a best experience or best skill user at a given threshold price (e.g., the user with the highest experience and/or skill rating at a given threshold price). For example, a photographer with the highest skill rating for low light photography who charges less than $1000 to photograph a wedding may be the best skill user for the action type "low light photography" at the price threshold "$1000."

In some examples, the aggregating system 108 may determine transferable skills. If the user 106 has a determined level of skill on one user tool, the aggregating system 108 may determine that the user is also likely to be skilled with another tool and/or another service. For example, a user skilled with a camera may also be skilled at sculpture. The aggregating system 108 may list such a user 106 in response to queries from the viewer 138.

In some examples, the aggregating system 108 (e.g., the record ingestion circuit 130 and/or records analytics circuit 128) may store action record data received from a user tool 102*a*, 102*b*, 102*c*, 102*n* and/or generated at the aggregating system 108 at an action record data store 134. Similarly, the record analytics circuit 128 may store user skills data, user experience data, and/or user analytics data at an analytics data store 136.

A viewer interface circuit 132 may generate a viewer interface 142 and serve the viewer interface 142 to a viewer computing device 140 for display to a viewer 138. The viewer computing device 140, in some examples, sends an interface query to the aggregating system 108 (e.g., to viewer interface circuit 132). The interface query may describe requested properties of the viewer interface 142 including, for example, action record data to be included in the viewer interface 142 (e.g., an action or type of action), user analytics data to be included in the viewer interface 142, etc. The viewer 138 may request any suitable experience, skill, or analytic data, for example, the data described herein with respect to the records analytics circuit 128. In response to the query, the viewer interface circuit 132 may generate the viewer interface 142 and/or serve the viewer interface 142 to the viewer computing device 140.

In some examples, the aggregation system 108 includes an application programming interface (API) circuit 131. The API circuit 131 may provide an application programming interface (API) that is accessible to applications 127 executing at an external server 129. The API circuit 131 may implement any suitable API including, for example, a RESTful web service. External applications, such as the application 127, may query the API circuit 131 for user experience, skill, and/or analytic data as described herein. The API circuit 131 may respond to queries by providing the requested experience, skill, and/or analytic data. In some examples, the API circuit 131 may also be utilized by the viewer interface circuit 132. For example, the viewer interface circuit 132 may query the API circuit 131 for user experience, skill, and/or analytic data and incorporate received data into the viewer interface 142.

The external server 129 may execute a process utilizing the received data. The external server 129 may execute an application that queries the API circuit 131 for user experience, skill and/or analytic data. For example, an apprenticeship licensing application executing at the external server 129 may receive experience, skill, and/or analytic data to determine whether to grant the user 106 an indication of completion. A car rental application may query the API circuit 131 to track the usage of rental cars and/or users 106 who are customers. An insurance company application may query the API circuit 131 to track the usage of insured user tools 102a, 102b, 102c, 102n and/or insured users 106.

Figure 2:
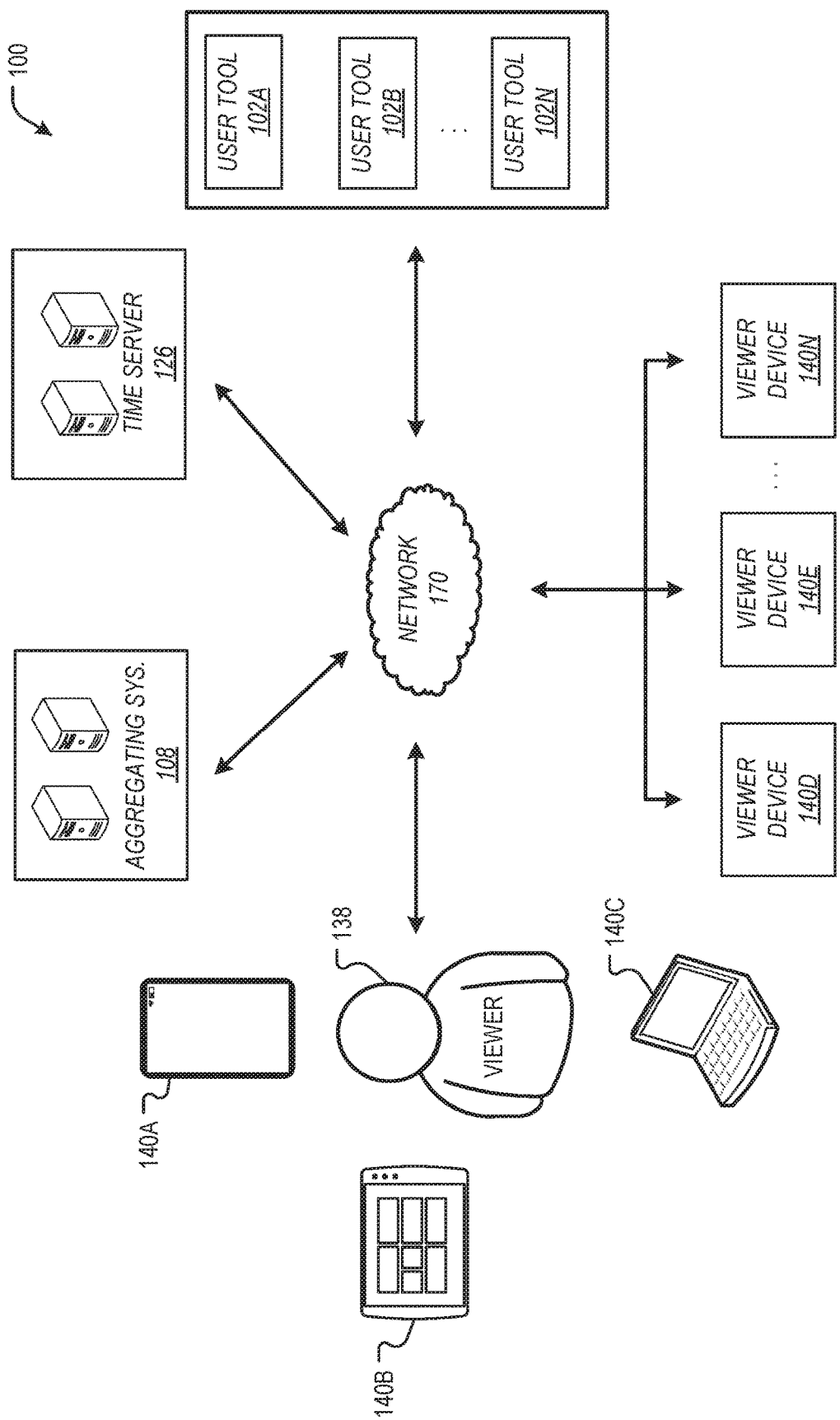
FIG. 2 is a block diagram showing another example of the environment of FIG. 1 showing additional components.

FIG. 2 is a block diagram showing another example of the environment 100 of FIG. 1 showing additional components. For example, FIG. 2 shows additional viewer computing devices 140a, 140h, 140c, 140d, 140e, 140n. Viewer computing devices 140a, 140b, 140c may be associated with the viewer 138 while viewer computing devices 140d, 140e, 140n may be associated with other viewers. Viewer computing devices 140a, 140b, 140c, 140d, 140e, 140n may be any suitable computing devices for receiving and displaying the viewer interface 142. For example, the viewer computing device 140a may be a mobile telephone. Viewer computing device 140b may be a tablet computer. Viewer computing device 140c may be a laptop computer. It will be appreciated, however, that various other types of viewer computing devices may be used. In some examples, a viewer, such as viewer 138, may also be a user. For example, the viewer 138 may receive data describing his or her own actions taken with a user tool 102a, 102b, 102c, 102n. FIG. 2 also shows user tools 102a, 102b, 102n, which may be configured as described with respect to FIG. 1 and may communicate on the network 170, as shown. Similarly, the time server system 126 may be configured as described with respect to FIG. 1 and may communicate on the network 170.

The various components of the environment 100 may be in communication with one another via a network 170. The network 170 may be or comprise any suitable network element operated according to any suitable network protocol. For example, one or more portions of network 170 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

Figure 3:
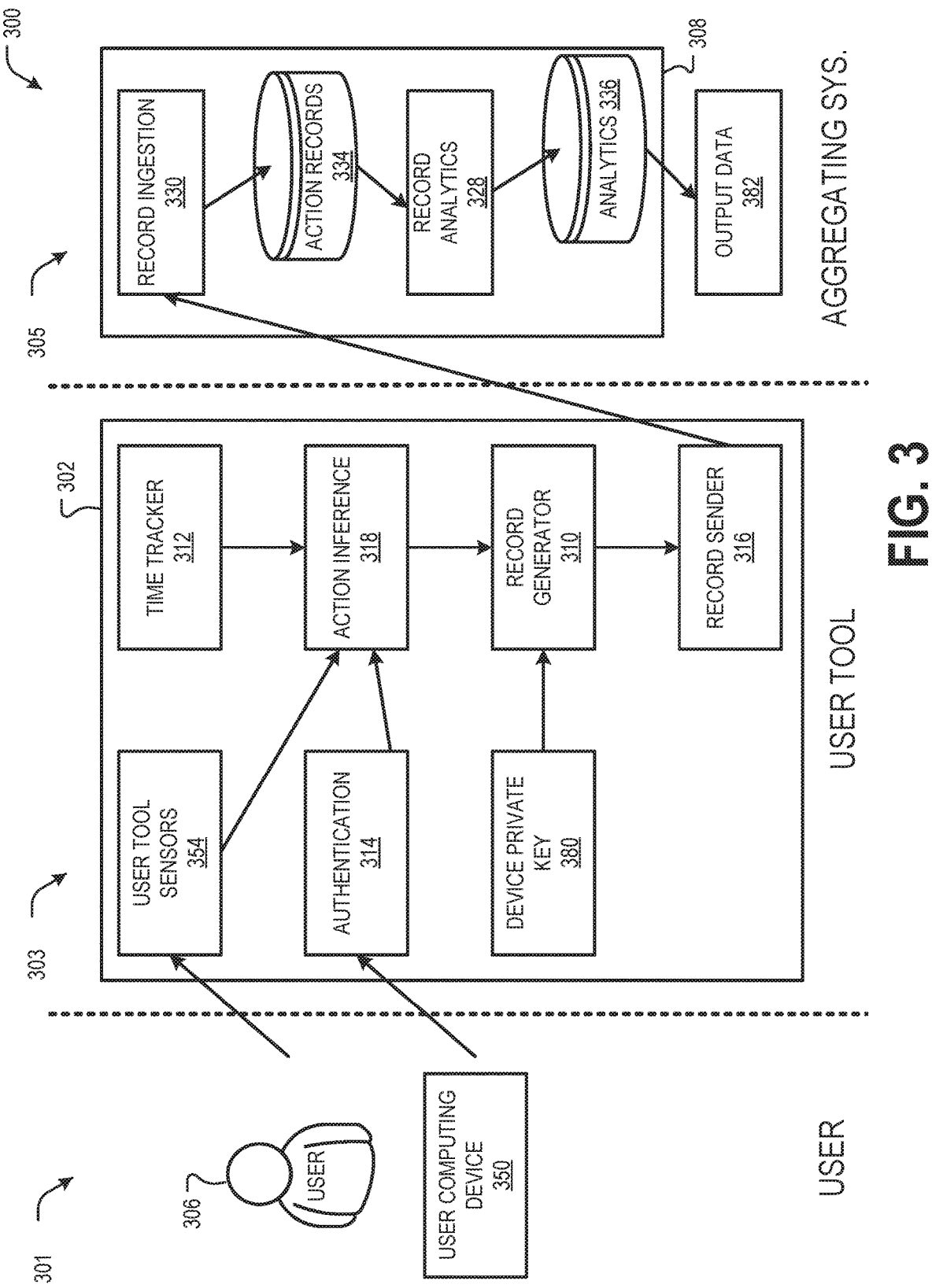
FIG. 3 is a chart showing one example of a workflow for aggregating tool use data.

FIG. 3 is a chart showing one example of a workflow 300 for aggregating tool use data. The workflow 300 includes a user level 301, a user tool level 303, and an aggregating system level 305. The user level 301 may include a user 306 and a user computing device 350. The user tool level 303 may comprise a user tool 302 including user tool sensors 354 along with an authentication circuit 314, a time tracker circuit 312, an action inference circuit 318, a record generator circuit 310 and a record sender circuit 316. The aggregation system level 305 includes an aggregation system 308 including a record ingestion circuit 330, a record analytics circuit 328 and data stores 334 and 336.

The user 306 may utilize the user tool 302 to perform an action. The user 306 may authenticate to the user tool 302 by providing direct user identity data, such as data 152 (FIG. 1), and/or through the user computing device 350. An authentication circuit 314 of the user tool 302 may receive and verify received user identity data, for example, similar to the authentication circuit 114 described herein above with respect to FIG. 1. User tool sensor 354 of the user tool 302 may be configured and positioned to sense the user's actions taken with the user tool 302, for example, similar to the sensors 154a, 154b, 154n, 124 (FIG. 1).

The authentication circuit may provide data to the action inference circuit 318 and/or to the record generator indicating that the user 306 has been successfully authenticated. The user tool sensors 354 may provide sensor data to the action inference circuit 318. The action interface circuit 318 may analyze the sensor data and detect actions taken by the user 306 with the user tool 302, for example, as described herein. The action inference circuit may also be in communication with the time tracker circuit 312 to obtain timestamp data for sensor data received from the user tool sensor 354.

The record generator circuit 316 may generate action record data, for example, as described herein. In some examples, the record generator circuit 316 may also be in communication with the time tracker circuit 312 to obtain timestamp data for various action record data that is generated. Action record data generated at the record generator circuit 316 may be provided to the record sender circuit 316, which may send the action record data to the aggregating system 308. In some examples, the record generator 310 may cryptographically sign outgoing action record data and/or other data with a device private key 380. The signed data may serve as tool authentication data that may be verified by the aggregating system 308.

The record ingestion circuit 330 of the aggregating system 308 may receive the action record data. In some examples, the record ingestion circuit 330 may verify that a cryptographic signature of the action record data corresponds to the user tool 302. For example, the record ingestion circuit 330 may decrypt all or a portion of the action record data with a public key associated with the user tool 302. If the decryption is successful, the signature may be verified. In some examples, the record ingestion circuit also writes received action record data to an action record data store 334. The record analytics circuit 328 may retrieve action record data from the action record data store 334 and generate experience data, skills data, and/or analytics data, as described herein. This data may be stored at an analytics data store 336. Output data 382 (e.g., experience data, skills data, and/or analytics data) may be provided to a viewer, such as the viewer 138, for example, as part of a viewer interface described herein. Output data 382 may also be provided to an internal or external application via the API circuit 131, as described herein.

Figure 4:
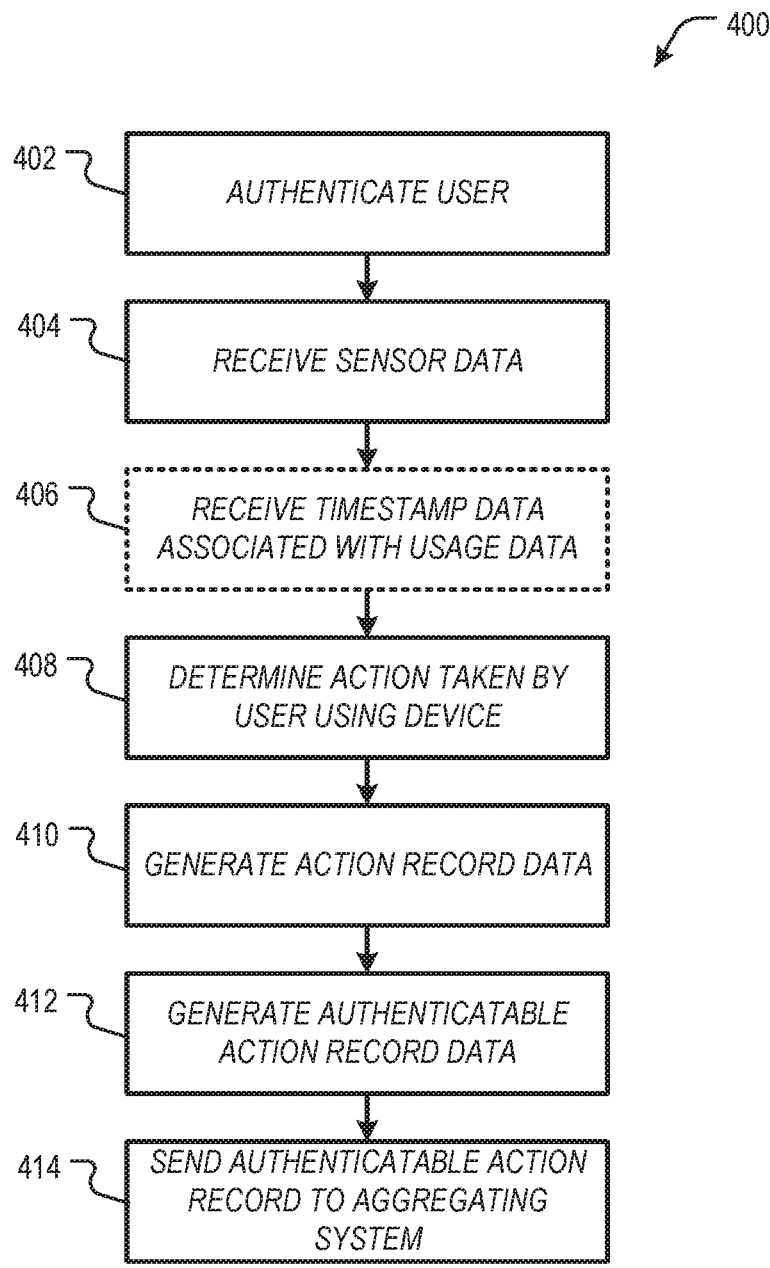
FIG. 4 is a flow chart showing one example of a process flow that may be executed by a user tool to generate action record data.

FIG. 4 is a flow chart showing one example of a process flow 400 that may be executed by a user tool (such as the user tools 102a, 102h, 102c, 102n, 302 described herein) to generate action record data. At action 402, the user tool (e.g., an authentication circuit) may authenticate the user. For example, the user tool may receive user identity data directly from the user and/or from a user computing device. At action 404, the user tool may receive sensor data from one or more user tool sensors. At action 406, the user tool (e.g., the time tracker circuit 112) may optionally receive timestamp data for the sensor data. Timestamp data may be an indication of a time to be included with the sensor data.

At action 408, the user tool (e.g., the action inference circuit 118) may detect a user action taken with the user tool based at least in part on the sensor data. At action 410, the user tool (e.g., the record generator circuit 110) may generate action record data describing the detected action. At action 412, the user tool may generate authenticatable action record data. For example, the user tool (e.g., the record generator circuit 110) may cryptographically sign the action record data with its own private key. At action 414, the user tool may send the action record data to the skill monitoring system (e.g., the aggregating system 108).

Figure 5:
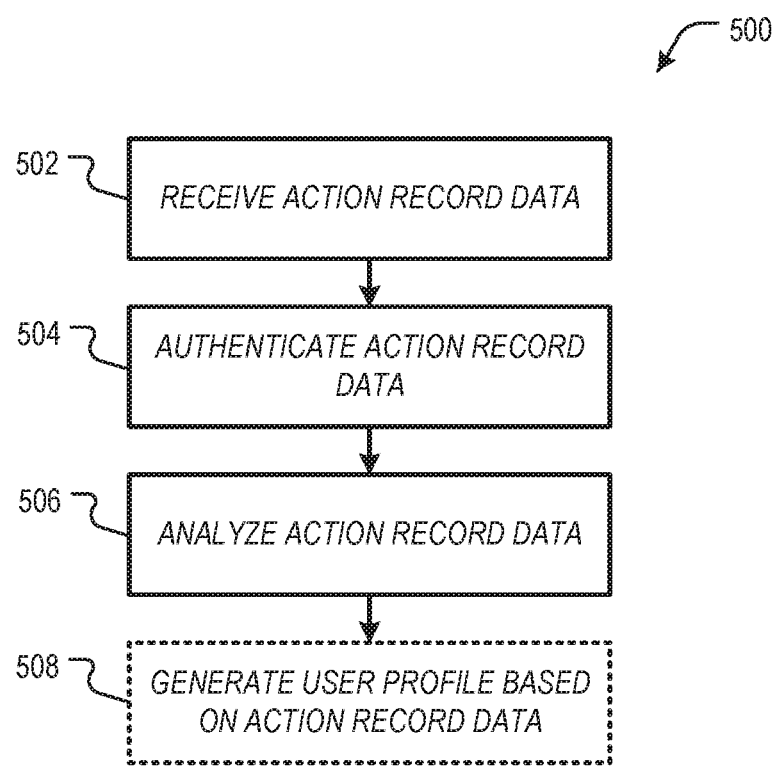
FIG. 5 is a flow chart showing one example of a process flow that may be executed by the aggregating system to aggregate user action

FIG. 5 is a flow chart showing one example of a process flow 500 that may be executed by the aggregating system to aggregate user action. At action 502, the aggregating system (e.g., the record ingestion circuit 130) may receive action record data from one or more user tools. At action 504, the aggregating system (e.g., the record ingestion circuit 130) may authenticate the action record data. Authenticating the action record data may include verifying a cryptographic signature of the user tool.

At action 506, the aggregating system (e.g., the record analytics circuit) may analyze the received action record data. For example, the aggregating system may generate and/or supplement experience data and/or skill data for the user indicated by the action record data. At action 508, the aggregating system (e.g., the record analytics circuit) may optionally generate and/or update a user profile for the user described by the action record data. The user profile may include, for example, user experience data, user skill data and/or analytic data describing the user. The user profile may include user experience data, user skill data and/or analytic data describing actions on the user on multiple user tools.

Figure 6:
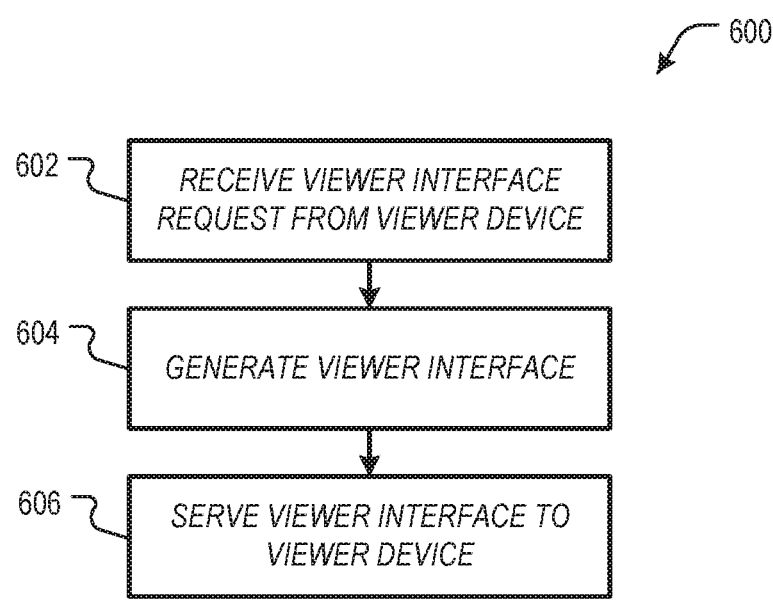
FIG. 6 is a flow chart showing one example of a process flow that may be executed by the aggregating system to provide a viewer interface to a viewer.

FIG. 6 is a flow chart showing one example of a process flow 600 that may be executed by the aggregating system to provide a viewer interface to a viewer. At action 602, the aggregating system (e.g., the viewer interface circuit 132) may receive a request from a viewer computing device for the viewer interface. The request may include data describing details of the data requested by the viewer computing device. For example, the request may indicate user experience, user skill and/or analytic data to be included in the viewer interface (e.g., the variations of experience, skill or analytic data described herein). In some examples, the request may indicate a particular user and/or a particular type of user be described. At action 604, the aggregating system (e.g., the viewer interface circuit) may generate the viewer interface and serve the viewer interface to the viewer computing device at action 606.

Figure 7:
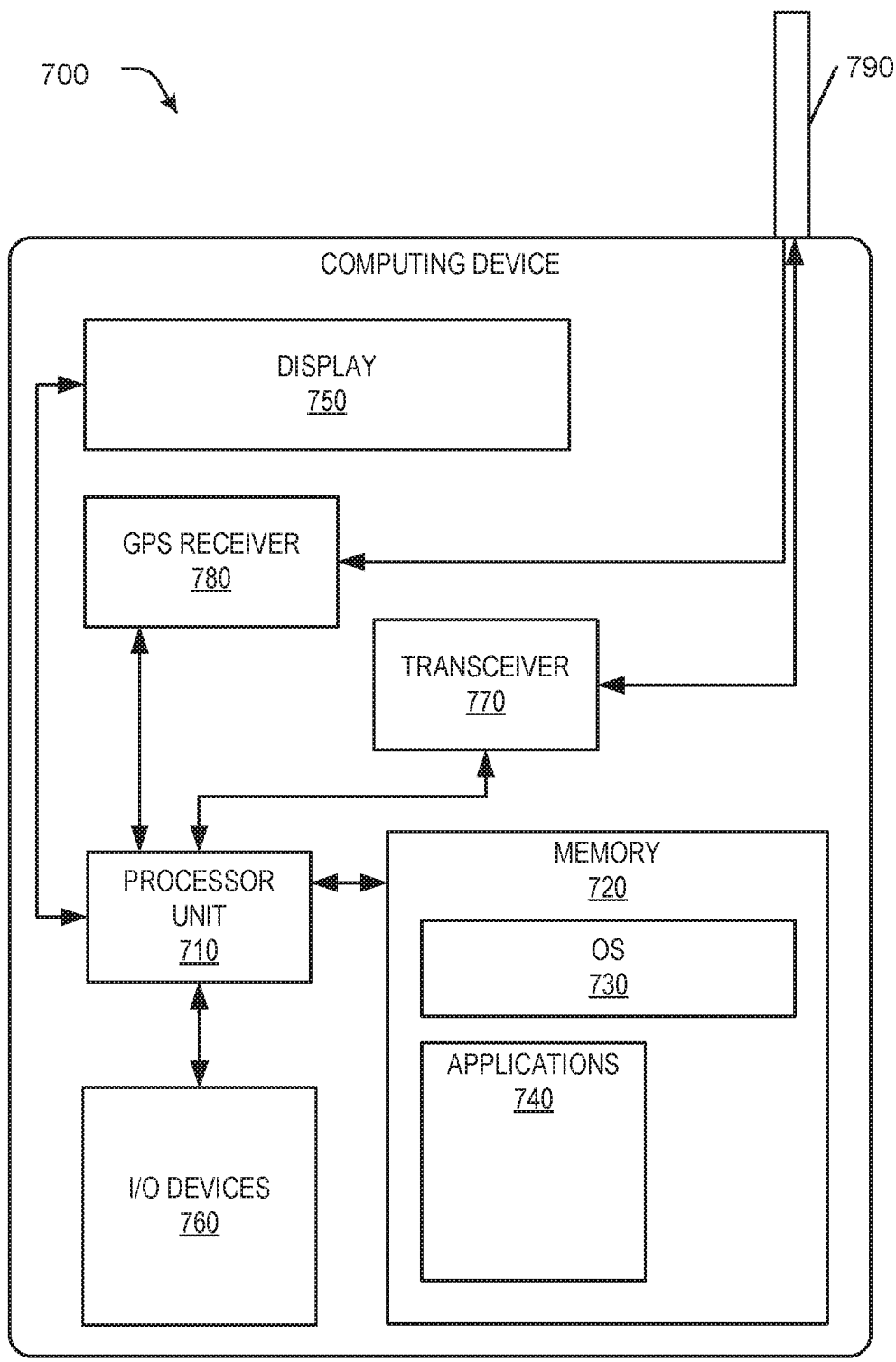
FIG. 7 is a block diagram showing an example architecture of a computing device.

FIG. 7 is a block diagram showing an example architecture 700 of a computing device. For example, the architecture 700 may be implemented in a user tool, a user computing device, and/or a viewer computing device. The architecture 700 comprises a processor unit 710. The processor unit 710 may include one or more processors. Any of a variety of different types of commercially available processors suitable for mobile computing devices may be used (for example, an XScale architecture microprocessor, a Microprocessor without Interlocked Pipeline Stages (MIPS) architecture processor, or another type of processor). A memory 720, such as a Random Access Memory (RAM), a Flash memory, or other type of memory or data storage, is typically accessible to the processor. The memory 720 may be adapted to store an operating system (OS) 730, as well as applications 740, such as, for example, those described herein.

The processor unit 710 may be coupled, either directly or via appropriate intermediary hardware, to a display 750 and to one or more input/output (I/O) devices 760, such as a keypad, a touch panel sensor, a microphone, and the like. I/O devices 760 may also include devices for interfacing with external sensors, such as sensors 124 of FIG. 1. I/O devices 760 may also include ports, sockets, and/or drivers for wired connections, such as Universal Serial Bus (USB), etc. Similarly, in some examples, the processor 710 may be coupled to a transceiver 770 that interfaces with an antenna 790. The transceiver 770 may be configured to both transmit and receive cellular network signals, wireless data signals, or other types of signals via the antenna 790, depending on the nature of the mobile computing device implemented by the architecture 700. Although one transceiver 770 is shown, in some examples, the architecture 700 includes additional transceivers. For example, a wireless transceiver may be utilized to communicate according to an IEEE 802.11 specification, such as Wi-Fi and/or to a short range communication medium, such as BLUETOOTH, near field communication (NFC), etc. Some short range communication mediums, such as NFC, may utilize a separate, dedicated transceiver. Further, in some configurations, an optional GPS receiver 780 or suitable location determining circuit may makes use of the antenna 790 to receive GPS signals or other suitable location signals.

Figure 8:
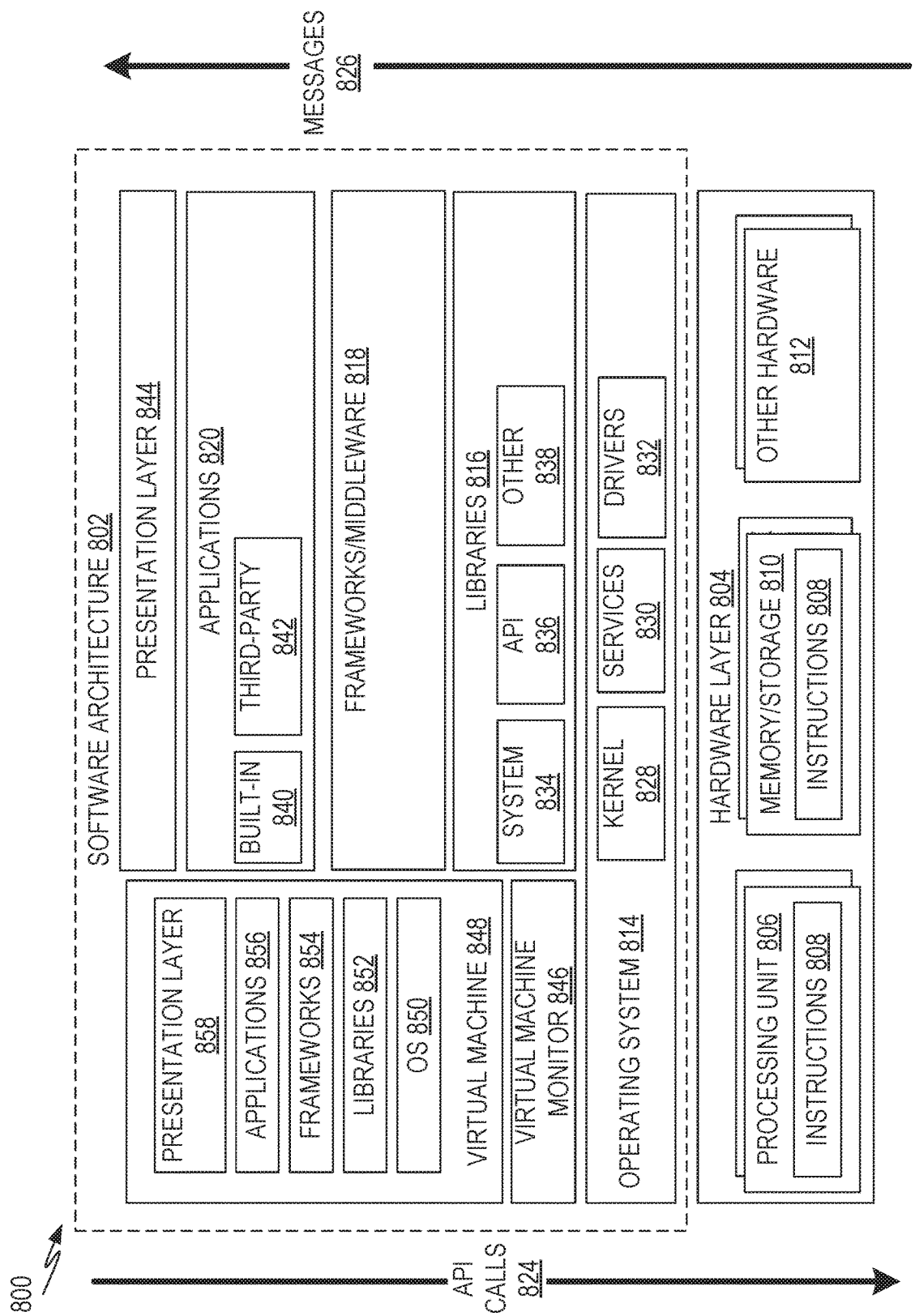
FIG. 8 is a block diagram showing one example of a software architecture for a computing device.

FIG. 8 is a block diagram 800 showing one example of a software architecture 802 for a computing device. The architecture 802 may be used in conjunction with various hardware architectures, for example, as described herein. FIG. 8 is merely a non-limiting example of a software architecture and many other architectures may be implemented to facilitate the functionality described herein. A representative hardware layer 804 is illustrated and may represent, for example, any of the above referenced computing devices. In some examples, the hardware layer 804 may be implemented according to the architecture 700 of FIG. 2 and/or the architecture 900 of FIG. 9.

The representative hardware layer 804 comprises one or more processing units 806 having associated executable instructions 808. Executable instructions 808 represent the executable instructions of the software architecture 802, including implementation of the methods, modules, components, circuits and so forth of FIGS. 1-6. Hardware layer 804 also includes memory and/or storage modules 810, which also have executable instructions 808. Hardware layer 804 may also comprise other hardware as indicated by block 812 which represents any other hardware of the hardware layer 804, such as the other hardware illustrated as part of hardware architecture 900.

In the example architecture of FIG. 8, the software 802 may be conceptualized as a stack of layers where each layer provides particular functionality. For example, the software 802 may include layers such as an operating system 814, libraries 816, frameworks/middleware 818, applications 820 and presentation layer 858. Operationally, the applications 820 and/or other components within the layers may invoke application programming interface (API) calls 824 through the software stack and receive a response, returned values, and so forth illustrated as messages 826 in response to the API calls 824. For example, API calls may be made by the application 127 and/or the viewer interface circuit 132 to the API circuit 131 to request user experience, skill, and/or analytic data as described herein The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system 834 libraries (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, MP3, AAC, AMR, JPG, PNG), graphics libraries (e.g., an Opener, framework that may be used to render 2D and 9D in a graphic content on a display), database libraries (e.g., SQLite that may provide various relational database functions), web libraries (e.g., WebKit that may provide web browsing functionality), and the like. For example, a database library may provide database functions for querying user experience, skill, and/or analytic data from one or more of data stores 134, 136 described herein. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 and/or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 includes built-in applications 840 and/or third party applications 842. Examples of representative built-in applications 840 may include, but are not limited to, a contacts application, a browser application, a book reader application, a location application, a media application, a messaging application, and/or a game application. Third party applications 842 may include any of the built in applications as well as a broad assortment of other applications. In a specific example, the third party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 842 may invoke the API calls 824 provided by the mobile operating system such as operating system 814 to facilitate functionality described herein.

The applications 820 may utilize built in operating system functions (e.g., kernel 828, services 830 and/or drivers 832), libraries (e.g., system 834, APIs 836, and other libraries 838), frameworks/middleware 818 to create user interfaces to interact with users of the system. Alternatively, or additionally, in some systems interactions with a user may occur through a presentation layer, such as presentation layer 844. In these systems, the application/module "logic" may be separated from the aspects of the application/module that interact with a user.

Some software architectures utilize virtual machines. In the example of FIG. 8, this is illustrated by virtual machine 848. A virtual machine creates a software environment where applications/modules may execute as if they were executing on a hardware computing device. A virtual machine is hosted by a host operating system (operating system 814) and typically, although not always, has a virtual machine monitor 846, which manages the operation of the virtual machine as well as the interface with the host operating system (i.e., operating system 814). A software architecture executes within the virtual machine such as an operating system 850, libraries 852, frameworks/middleware 854, applications 856 and/or presentation layer 858. These layers of software architecture executing within the virtual machine 848 may be the same as corresponding layers previously described or may be different.

Figure 9:
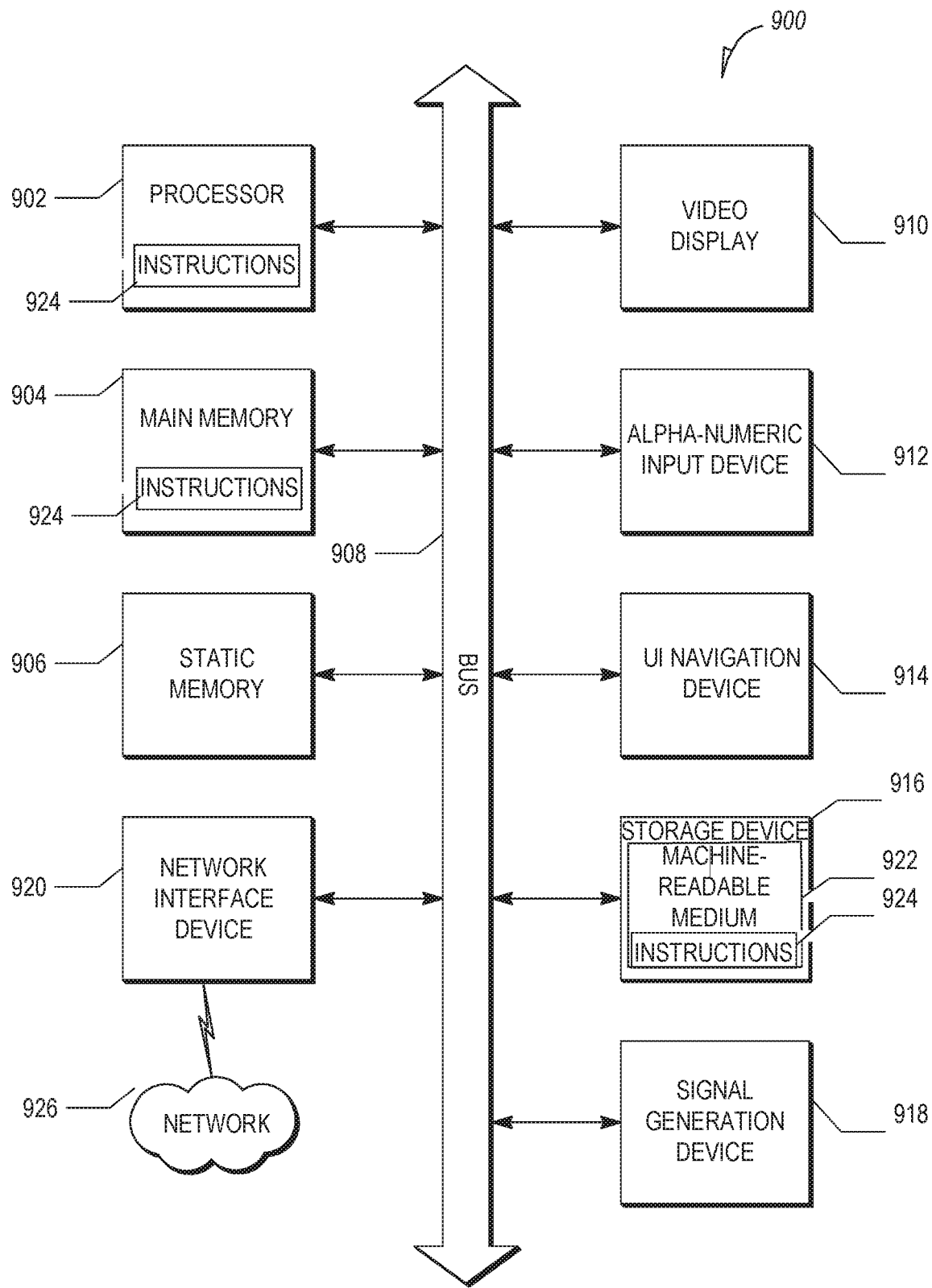
FIG. 9 is a block diagram illustrating a computing device hardware architecture, within which a set or sequence of instructions may be executed to cause the machine to perform examples of any one of the methodologies discussed herein.

FIG. 9 is a block diagram illustrating a computing device hardware architecture 900, within which a set or sequence of instructions may be executed to cause the machine to perform examples of any one of the methodologies discussed herein. For example, the architecture 900 may execute the software architecture 802 described with respect to FIG. 8. The architecture 900 may operate as a standalone device or may be connected (e.g., networked) to other machines. In a networked deployment, the architecture 900 may operate in the capacity of either a server or a client machine in server-client network environments, or it may act as a peer machine in peer-to-peer (or distributed) network environments. The architecture 900 may be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine.

Example architecture 900 includes a processor unit 902 comprising at least one processor (e.g., a central processing unit (CPU), a graphics processing unit (GPU) or both, processor cores, compute nodes, etc.). The architecture 900 may further comprise a main memory 904 and a static memory 906, which communicate with each other via a link 908 (e.g., bus). The architecture 900 may further include a video display unit 910, an alphanumeric input device 912 (e.g., a keyboard), and a user interface (UI) navigation device 914 (e.g., a mouse). In some examples, the video display unit 910, input device 912 and UI navigation device 914 are incorporated into a touch screen display. The architecture 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the architecture 900, with the main memory 904, static memory 906, and the processor 902 also constituting machine-readable media. Instructions stored at the machine-readable medium 922 may include, for example, instructions for implementing the software architecture 802, instructions for executing any of the features described herein, etc.

While the machine-readable medium 922 is illustrated in an example to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples, as described herein, may include, or may operate on, logic or a number of components, engines, or modules, circuits, which for the sake of consistency are termed circuits, although it will be understood that these terms may be used interchangeably. Circuits may be hardware, software, or firmware communicatively coupled to one or more processors in order to carry out the operations described herein. Circuits may be hardware circuits, and as such circuits may be considered tangible entities capable of performing specified operations and may be configured or arranged in a certain manner. In an example, circuits may be arranged (e.g., internally or with respect to external entities such as other circuits) in a specified manner as a circuit. In an example, the whole or part of one or more computing platforms (e.g., a standalone, client or server computing platform) or one or more hardware processors may be configured by firmware or software (e.g., instructions, an application portion, or an application) as a circuit that operates to perform specified operations. In an example, the software may reside on a machine-readable medium. In an example, the software, when executed by the underlying hardware of the circuit, causes the hardware to perform the specified operations. Accordingly, the term hardware circuit is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which circuits are temporarily configured, each of the circuits need not be instantiated at any one moment in time. For example, where the circuits comprise a general-purpose hardware processor configured using software; the general-purpose hardware processor may be configured as respective different circuits at different times. Software may accordingly configure a hardware processor, for example, to constitute a particular circuit at one instance of time and to constitute a different circuit at a different instance of time.

ADDITIONAL NOTES & EXAMPLES

Example 1 is a system, comprising: a record ingestion circuit to: receive action record data from a user tool, wherein the action record data describes an action performed with the user tool by the user; and receive user name data describing the user; a record analytics circuit to generate user experience data for the user, wherein the user experience data describes a plurality of actions performed by the user with the user tool including the action; and an application programming interface (API) circuit to: receive from a requesting application a query for data describing the plurality of actions; and send to the requesting application the data describing the plurality of actions.

In Example 2, the subject matter of Example 1 optionally includes wherein the action record data comprises timestamp data indicating a time of the action, and wherein the record ingestion circuit is further to determine that a cryptographic signature of the timestamp data was generated by a time server system.

In Example 3, the subject matter of any one or more of Examples 1-2 optionally include the user tool, wherein the user tool comprises an authentication circuit to: receive authentication data from the user; and determine that the authentication data corresponds to the user.

In Example 4, the subject matter of any one or more of Examples 1-3 optionally include the user tool, wherein the user tool comprises an authentication circuit to: receive user identity data from the user from a user computing device, wherein the user identity data comprises biometric data describing the user; and determine that the biometric data describing the user corresponds to reference biometric data describing the user.

In Example 5, the subject matter of any one or more of Examples 1-4 optionally include the user tool, wherein the user tool comprises: a data receiver circuit to receive sensor data from at least one user tool sensor; and an action inference circuit to determine a time of the action based at least in part on the sensor data; and a record generator circuit to generate the action record including a portion of the sensor data captured within a threshold of the time of the action.

In Example 6, the subject matter of any one or more of Examples 1-5 optionally include the user tool, wherein the user tool comprises a data receiver circuit to: receive first sensor data from a user tool sensor; and receive second sensor data from a second device associated with the user tool.

In Example 7, the subject matter of any one or more of Examples 1-6 optionally include wherein the action records data further comprises result data describing a result of the action, and wherein the records analytics circuit is further to generate user skill data describing a plurality of results of actions by the user with the user tool, wherein the plurality of results of actions comprises the result of the action.

In Example 8, the subject matter of Example 7 optionally includes wherein the records analytics circuit is further to generate ranking data describing skill data for a plurality of users including the user.

In Example 9, the subject matter of any one or more of Examples 1-8 optionally include wherein the user tool is of a type, and wherein the record analytics circuit is further to generate aggregated experience data describing experience of a plurality of users with user tools of the type.

In Example 10, the subject matter of any one or more of Examples 1-9 optionally include wherein the records analytics circuit is further to: receive result data describing a result of the action; and generate a skill level for the action based at least in part on the result data.

In Example 11, the subject matter of any one or more of Examples 1-10 optionally include wherein the record analytics circuit is further to: receive result data describing a result of the action; generate a skill level for the action based at least in part on the result data; receive price data describing a price charged by the user for use of the user tool; and generate a price-to-skill ratio for the user based at least in part on the skill level and the price data.

In Example 12, the subject matter of any one or more of Examples 1-11 optionally include wherein the action record data comprises safety data describing a state of a safety feature of the user tool during the action, wherein the record analytics circuit is further to generate a safety rating for the action based at least in part on the safety data.

In Example 13, the subject matter of any one or more of Examples 1-12 optionally include wherein the record analytics circuit is also to generate a user profile for the user, wherein the user profile describes the plurality of actions and a second plurality of actions performed by the user with a second user tool.

In Example 14, the subject matter of any one or more of Examples 1-13 optionally include wherein the action record data further comprises tool authentication data describing the user tool, and wherein the record ingestion circuit is also to determine that the tool authentication data corresponds to the user tool.

In Example 15, the subject matter of any one or more of Examples 1-14 optionally include a viewer interface circuit to: generate a viewer interface comprising data describing the plurality of actions; and serve the viewer interface to a viewer computing device.

In Example 16, the subject matter of Example 15 optionally includes wherein the viewer interface circuit is further to receive from the viewer computing device a viewer interface query comprising action type data describing a type of action and price data describing a threshold price, wherein the viewer interface comprises an indication of a best experience user selected from a plurality of users having a price for use of the user tool at or below the price, wherein the best experience user has the highest experience with the type of action among the plurality of users.

Example 17 is a method, comprising: receiving action record data from a user tool, wherein the action record data describes an action performed with the user tool by a user; receiving user name data describing the user; generating user experience data for the user, wherein the user experience data describes a plurality of actions performed by the user with the user tool including the action; and receiving from a requesting application a query for data describing the plurality of actions; and sending to the requesting application the data describing the plurality of actions.

In Example 18, the subject matter of Example 17 optionally includes wherein the action record data comprises timestamp data indicating a time of the action, further comprising determining that a cryptographic signature of the timestamp data was generated by a time server system.

In Example 19, the subject matter of any one or more of Examples 17-18 optionally include wherein the user name data comprises data indicating that the user tool authenticated the user.

In Example 20, the subject matter of any one or more of Examples 17-19 optionally include wherein the user name data comprises biometric data describing the user.

In Example 21, the subject matter of any one or more of Examples 17-20 optionally include wherein the action record data comprises data describing a time of the action.

In Example 22, the subject matter of any one or more of Examples 17-21 optionally include wherein a first portion of the action records data is captured by a user tool sensor and a second portion of the action records data is captured by a second device associated with the user tool.

In Example 23, the subject matter of any one or more of Examples 17-22 optionally include wherein the action records data further comprises result data describing a result of the action, further comprising generating user skill data describing a plurality of results of actions by the user with the user tool, wherein the plurality of results of actions comprises the result of the action.

In Example 24, the subject matter of Example 23 optionally includes generating ranking data describing skill data for a plurality of users including the user.

In Example 25, the subject matter of any one or more of Examples 17-24 optionally include wherein the user tool is of a type, further comprising generating aggregated experience data describing experience of a plurality of users with user tools of the type.

In Example 26, the subject matter of any one or more of Examples 17-25 optionally include receiving result data describing a result of the action; and generating a skill level for the action based at least in part on the result data.

In Example 27, the subject matter of any one or more of Examples 17-26 optionally include receiving result data describing a result of the action; generating a skill level for the action based at least in part on the result data; receiving price data describing a price charged by the user for use of the user tool; and generating a price-to-skill ratio for the user based at least in part on the skill level and the price data.

In Example 28, the subject matter of any one or more of Examples 17-27 optionally include wherein the action record data comprises safety data describing a state of a safety feature of the user tool during the action, further comprising generating a safety rating for the action based at least in part on the safety data.

In Example 29, the subject matter of any one or more of Examples 17-28 optionally include generating a user profile for the user, wherein the user profile describes the plurality of actions and a second plurality of actions performed by the user with a second user tool.

In Example 30, the subject matter of any one or more of Examples 17-29 optionally include wherein the action record data further comprises tool authentication data describing the user tool, further comprising determining that the tool authentication data corresponds to the user tool.

In Example 31, the subject matter of any one or more of Examples 17-30 optionally include generating a viewer interface comprising data describing the plurality of actions; and serving the viewer interface to a viewer computing device.

In Example 32, the subject matter of Example 31 optionally includes receiving from the viewer computing device a viewer interface query comprising action type data describing a type of action and price data describing a threshold price, wherein the viewer interface comprises an indication of a best experience user selected from a plurality of users having a price for use of the user tool at or below the price, wherein the best experience user has the highest experience with the type of action among the plurality of users.

Example 33 is an apparatus comprising means for performing any of the Examples 17-31.

Example 34 is at least one computer readable medium comprising instructions to perform any of the methods of Examples 17-31.

Example 35 is an apparatus, comprising: means for receiving action record data from a user tool, wherein the action record data describes an action performed with the user tool by a user, means for receiving user name data describing the user; means for generating user experience data for the user, wherein the user experience data describes a plurality of actions performed by the user with the user tool including the action; and means for receiving from a requesting application a query for data describing the plurality of actions; and means for sending to the requesting application the data describing the plurality of actions.

In Example 36, the subject matter of Example 35 optionally includes wherein the action record data comprises timestamp data indicating a time of the action, further comprising means for determining that a cryptographic signature of the timestamp data was generated by a time server system.

In Example 37, the subject matter of any one or more of Examples 35-36 optionally include wherein the user name data comprises data indicating that the user tool authenticated the user.

In Example 38, the subject matter of any one or more of Examples 35-37 optionally include wherein the user name data comprises biometric data describing the user.

In Example 39, the subject matter of any one or more of Examples 35-38 optionally include wherein the action record data comprises data describing a time of the action.

In Example 40, the subject matter of any one or more of Examples 35-39 optionally include wherein a first portion of the action records data is captured by a user tool sensor and a second portion of the action records data is captured by a second device associated with the user tool.

In Example 41, the subject matter of any one or more of Examples 35-40 optionally include wherein the action records data further comprises result data describing a result of the action, further comprising means for generating user skill data describing a plurality of results of actions by the user with the user tool, wherein the plurality of results of actions comprises the result of the action.

In Example 42, the subject matter of Example 41 optionally includes means for generating ranking data describing skill data for a plurality of users including the user.

In Example 43, the subject matter of any one or more of Examples 35-42 optionally include wherein the user tool is of a type, further comprising means for generating aggregated experience data describing experience of a plurality of users with user tools of the type.

In Example 44, the subject matter of any one or more of Examples 35-43 optionally include means for receiving result data describing a result of the action; and means for generating a skill level for the action based at least in part on the result data.

In Example 45, the subject matter of any one or more of Examples 35-44 optionally include means for receiving result data describing a result of the action; means for generating a skill level for the action based at least in part on the result data; means for receiving price data describing a price charged by the user for use of the user tool; and means for generating a price-to-skill ratio for the user based at least in part on the skill level and the price data.

In Example 46, the subject matter of any one or more of Examples 35-45 optionally include wherein the action record data comprises safety data describing a state of a safety feature of the user tool during the action, further comprising means for generating a safety rating for the action based at least in part on the safety data.

In Example 47, the subject matter of any one or more of Examples 35-46 optionally include means for generating a user profile for the user, wherein the user profile describes the plurality of actions and a second plurality of actions performed by the user with a second user tool.

In Example 48, the subject matter of any one or more of Examples 35-47 optionally include wherein the action record data further comprises tool authentication data describing the user tool, further comprising means for determining that the tool authentication data corresponds to the user tool.

In Example 49, the subject matter of any one or more of Examples 35-48 optionally include means for generating a viewer interface comprising data describing the plurality of actions; and means for serving the viewer interface to a viewer computing device.

In Example 50, the subject matter of Example 49 optionally includes means for receiving from the viewer computing device a viewer interface query comprising action type data describing a type of action and price data describing a threshold price, wherein the viewer interface comprises an indication of a best experience user selected from a plurality of users having a price for use of the user tool at or below the price, wherein the best experience user has the highest experience with the type of action among the plurality of users.

Example 51 is a user tool, comprising: an authentication circuit to: receive user identity data from a user; determine that the user identity data corresponds to the user; a data receiver circuit to receive sensor data from at least one user tool sensor; and an action inference circuit to determine a time of the action based at least in part on the sensor data; a record generator circuit to generate an action record including at least a portion of the sensor data captured within a threshold time of the action; and a record sender circuit to send the action record to an aggregating system.

In Example 52, the subject matter of Example 51 optionally includes wherein the sensor data comprises first sensor data from a user tool sensor that is integral to the user tool, and wherein the data receive circuit is also to receive second sensor data from a device associated with the user tool.

In Example 53, the subject matter of any one or more of Examples 51-52 optionally include wherein the data receiver circuit is positioned to receive second sensor data from a device associated with the user tool via a short range communication medium.

In Example 54, the subject matter of any one or more of Examples 51-53 optionally include wherein the authentication circuit is also to: receive the user identity data from a user computing device, wherein the user identity data comprises biometric data describing the user; and determine that the biometric data describing the user corresponds to reference biometric data describing the user.

In Example 55, the subject matter of any one or more of Examples 51-54 optionally include wherein the data receiver circuit is also to receive a setting from a user interface of user tool, and wherein the record generator circuit is also to include the setting in the action record.

In Example 56, the subject matter of any one or more of Examples 51-55 optionally include a time tracker circuit to: receive timestamp data from a time server, wherein the timestamp data describes a time that the sensor data is received from the at least one user tool sensor; and append the timestamp data to the sensor data to generate timestamped sensor data.

In Example 57, the subject matter of any one or more of Examples 51-56 optionally include wherein the record generator is also to cryptographically sign the action record to generate authenticatable action record data, and where to send the action record data to an aggregating system includes sending the authenticatable action record data to the aggregating system.

Example 58 is a method comprising: receiving, by a user tool, user identity data from a user; determining, by the user tool, that the user identity data corresponds to the user; receiving, by the user tool, sensor data from at least one user tool sensor; and determining, by the user tool, a time of the action based at least in part on the sensor data; generating, by the user tool, an action record including at least a portion of the sensor data captured within a threshold time of the action; and sending, by the user tool, the action record to an aggregating system.

In Example 59, the subject matter of Example 58 optionally includes wherein the sensor data comprises first sensor data from a user tool sensor that is integral to the user tool, and further comprising receiving second sensor data from a device associated with the user tool.

In Example 60, the subject matter of any one or more of Examples 58-59 optionally include receiving, by the user tool, second sensor data from a device associated with the user tool via a short range communication medium.

In Example 61, the subject matter of any one or more of Examples 58-60 optionally include receiving, by the user tool, the user identity data from a user computing device, wherein the user identity data comprises biometric data describing the user; and determining, by the user tool, that the biometric data describing the user corresponds to reference biometric data describing the user.

In Example 62, the subject matter of any one or more of Examples 58-61 optionally include receiving, by the user tool, a setting from a user interface of user tool, and wherein the record generator circuit is also to include the setting in the action record.

In Example 63, the subject matter of any one or more of Examples 58-62 optionally include receiving, by the user tool, timestamp data from a time server, wherein the timestamp data describes a time that the sensor data is received from the at least one user tool sensor; and appending, by the user tool, the timestamp data to the sensor data to generate timestamped sensor data.

In Example 64, the subject matter of any one or more of Examples 58-63 optionally include cryptographically signing the action record, by the user tool, to generate authenticatable action record data, and where to send the action record data to an aggregating system includes sending the authenticatable action record data to the aggregating system.

Example 65 is an apparatus comprising means for performing any of the Examples 58-64.

Example 66 is at least one computer readable medium comprising instructions to perform any of the methods of Examples 58-64.

Example 67 is an apparatus comprising: means for receiving, by a user tool, user identity data from a user; means for determining, by the user tool, that the user identity data corresponds to the user; means for receiving, by the user tool, sensor data from at least one user tool sensor; and means for determining, by the user tool, a time of the action based at least in part on the sensor data; means for generating, by the user tool, an action record including at least a portion of the sensor data captured within a threshold time of the action; and means for sending, by the user tool, the action record to an aggregating system.

In Example 68, the subject matter of Example 67 optionally includes wherein the sensor data comprises first sensor data from a user tool sensor that is integral to the user tool, and further comprising means for receiving second sensor data from a device associated with the user tool.

In Example 69, the subject matter of any one or more of Examples 67-68 optionally include means for receiving, by the user tool, second sensor data from a device associated with the user tool via a short range communication medium.

In Example 70, the subject matter of any one or more of Examples 67-69 optionally include means for receiving, by the user tool, the user identity data from a user computing device, wherein the user identity data comprises biometric data describing the user; and means for determining, by the user tool, that the biometric data describing the user corresponds to reference biometric data describing the user.

In Example 71, the subject matter of any one or more of Examples 67-70 optionally include means for receiving, by the user tool, a setting from a user interface of user tool, and wherein the record generator circuit is also to include the setting in the action record.

In Example 72, the subject matter of any one or more of Examples 67-71 optionally include means for receiving, by the user tool, timestamp data from a time server, wherein the timestamp data describes a time that the sensor data is received from the at least one user tool sensor; and means for appending, by the user tool, the timestamp data to the sensor data to generate timestamped sensor data.

In Example 73, the subject matter of any one or more of Examples 67-72 optionally include means for cryptographically signing the action record, by the user tool, to generate authenticatable action record data, and where to send the action record data to an aggregating system includes sending the authenticatable action record data to the aggregating system.

Example 74 is a system, comprising: a record ingestion circuit to: receive action record data from a user tool, wherein the action record data describes an action performed with the user tool by the user; and receive user name data describing the user; a record analytics circuit to generate user experience data for the user, wherein the user experience data describes a plurality of actions performed by the user with the user tool including the action; and a viewer interface circuit to: generate a viewer interface comprising the user experience data; and serve the viewer interface to a viewer computing device.

In Example 75, the subject matter of Example 74 optionally includes wherein the viewer interface circuit is also to receive a viewer interface request from the viewer computing device.

In Example 76, the subject matter of any one or more of Examples 74-75 optionally include wherein the action records data further comprises result data describing a result of the action, and wherein the records analytics circuit is further to generate user skill data describing a plurality of results of actions by the user with the user tool, wherein the plurality of results of actions comprises the result of the action.

In Example 77, the subject matter of Example 76 optionally includes wherein to generate the viewer interface comprises incorporating into the viewer interface the user experience data and the result data.

Example 78 is a method, comprising: receiving action record data from a user tool, wherein the action record data describes an action performed with the user tool by the user; receiving user name data describing the user; generating user experience data for the user, wherein the user experience data describes a plurality of actions performed by the user with the user tool including the action; generating a viewer interface comprising the user experience data; and serving the viewer interface to a viewer computing device.

In Example 79, the subject matter of Example 78 optionally includes receiving a viewer interface request from the viewer computing device.

In Example 80, the subject matter of any one or more of Examples 78-79 optionally include wherein the action records data further comprises result data describing a result of the action, and further comprising generating user skill data describing a plurality of results of actions by the user with the user tool, wherein the plurality of results of actions comprises the result of the action.

In Example 81, the subject matter of Example 80 optionally includes wherein generating the viewer interface comprises incorporating into the viewer interface the user experience data and the result data.

Example 82 is an apparatus comprising means for performing any of the Examples 78-81.

Example 83 is at least one computer readable medium comprising instructions to perform any of the methods of Examples 78-81.

Example 84 is an apparatus, comprising: means for receiving action record data from a user tool, wherein the action record data describes an action performed with the user tool by the user; means for receiving user name data describing the user; means for generating user experience data for the user, wherein the user experience data describes a plurality of actions performed by the user with the user tool including the action; means for generating a viewer interface comprising the user experience data; and means for serving the viewer interface to a viewer computing device.

In Example 85, the subject matter of Example 84 optionally includes means for receiving a viewer interface request from the viewer computing device.

In Example 86, the subject matter of any one or more of Examples 84-85 optionally include wherein the action records data further comprises result data describing a result of the action, and further comprising means for generating user skill data describing a plurality of results of actions by the user with the user tool, wherein the plurality of results of actions comprises the result of the action.

In Example 87, the subject matter of Example 86 optionally includes wherein generating the viewer interface comprises incorporating into the viewer interface the user experience data and the result data. The above detailed description includes references to the accompanying drawings, which form a part of the detailed description. The drawings show, by way of illustration, specific examples that may be practiced. These examples are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other examples may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as examples may feature a subset of said features. Further, examples may include fewer features than those disclosed in a particular example. Thus, the following claims are hereby incorporated into the Detailed Description, with a claim standing on its own as a separate example. The scope of the examples disclosed herein is to be determined with reference to the appended claims, along with the full scope of equivalents to which such claims are entitled.

What is claimed is:

1. A user tool experience system, comprising:
   a user tool, comprising:
      a user tool sensor positioned to capture first sensor data describing an action of a user taken with the user tool;
      an action inference circuit to determine a time of the action based at least in part on the first sensor data;
      a record generator circuit to:
         generate action record data including a portion of the first sensor data captured within a threshold of the time of the action; and
         encrypt the action record data using a private cryptographic key associated with the user tool;
   a record ingestion circuit to:
      receive the action record data from a user tool;

decrypt the action record data using a public cryptographic key associated with the private cryptographic key; and receive user name data describing the user;

a record analytics circuit to generate user experience data for the user, wherein the user experience data describes a plurality of actions performed by the user with the user tool including the action; and an application programming interface (API) circuit to:
receive from a requesting application a query for data describing the plurality of actions; and
send to the requesting application the data describing the plurality of actions.

2. The system of claim 1, wherein the action record data comprises timestamp data indicating a time of the action, and wherein the record ingestion circuit is further to determine that a cryptographic signature of the timestamp data was generated by a time server system.

3. The system of any of claim 1, wherein the user tool comprises an authentication circuit to:
receive authentication data from the user; and
determine that the authentication data corresponds to the user.

4. The system of claim 1, wherein the user tool comprises an authentication circuit to:
receive user identity data from the user from a user computing device, wherein the user identity data comprises biometric data describing the user; and
determine that the biometric data describing the user corresponds to reference biometric data describing the user.

5. The system of claim 1, wherein the user tool further comprises a data receiver circuit to:
receive at least a portion of the first sensor data from a user tool sensor; and
receive second sensor data from a second device associated with the user tool, wherein the action record data comprises at least a portion of the second sensor data.

6. The system of claim 1, wherein the action records data further comprises result data describing a result of the action, and wherein the records analytics circuit is further to generate user skill data describing a plurality of results of actions by the user with the user tool, wherein the plurality of results of actions comprises the result of the action.

7. The system of claim 6, wherein the records analytics circuit is further to generate ranking data describing skill data for a plurality of users including the user.

8. The system of claim 1, wherein the user tool is of a type, and wherein the record analytics circuit is further to generate aggregated experience data describing experience of a plurality of users with user tools of the type.

9. The system of claim 1, wherein the records analytics circuit is further to:
receive result data describing a result of the action; and
generate a skill level for the action based at least in part on the result data.

10. The system of claim 1, wherein the record analytics circuit is further to:
receive result data describing a result of the action;
generate a skill level for the action based at least in part on the result data;
receive price data describing a price charged by the user for use of the user tool; and
generate a price-to-skill ratio for the user based at least in part on the skill level and the price data.

11. The system of claim 1, wherein the action record data comprises safety data describing a state of a safety feature of the user tool during the action; wherein the record analytics circuit is further to generate a safety rating for the action based at least in part on the safety data.

12. The system of claim 1, wherein the record analytics circuit is also to generate a user profile for the user, wherein the user profile describes the plurality of actions and a second plurality of actions performed by the user with a second user tool.

13. The system of claim 1, wherein the action record data further comprises tool authentication data describing the user tool, and wherein the record ingestion circuit is also to determine that the tool authentication data corresponds to the user tool.

14. The system of claim 1, further comprising a viewer interface circuit to:
generate a viewer interface comprising data describing the plurality of actions; and
serve the viewer interface to a viewer computing device.

15. The system of claim 14, wherein the viewer interface circuit is further to receive from the viewer computing device a viewer interface query comprising action type data describing a type of action and price data describing a threshold price, wherein the viewer interface comprises an indication of a best experience user selected from a plurality of users having a price for use of the user tool at or below the price, wherein the best experience user has the highest experience with the type of action among the plurality of users.

16. A method for aggregating user tool experience, comprising:
capturing, by a user tool sensor positioned at a user tool, first sensor data describing an action of a user taken with the user tool;
determining, by the user tool, a time of the action based at least in part on the first sensor data;
generating, by the user tool, action record data including a portion of the first sensor data captured within a threshold time of the action;
encrypting, by the user tool, the action record data using a private cryptographic key associated with the user tool;
receiving the action record data from a user tool;
receiving user name data describing the user;
generating user experience data for the user, wherein the user experience data describes a plurality of actions performed by the user with the user tool including the action; and
receiving from a requesting application a query for data describing the plurality of actions; and
sending to the requesting application the data describing the plurality of actions.

17. The method of claim 16, further comprising:
receiving result data describing a result of the action;
generating a skill level for the action based at least in part on the result data;
receiving price data describing a price charged by the user for use of the user tool; and
generating a price-to-skill ratio for the user based at least in part on the skill level and the price data.

18. At least one non-transitory computer readable medium comprising instructions for performing:
capturing, by a user tool sensor positioned at a user tool, first sensor data describing an action of a user taken with the user tool;
determining, by the user tool, a time of the action based at least in part on the first sensor data;

generating, by the user tool, action record data including a portion of the first sensor data captured within a threshold time of the action;

encrypting, by the user tool, the action record data using a private cryptographic key associated with the user tool;

receiving action record data from a user tool;

receiving user name data describing the user;

generating user experience data for the user, wherein the user experience data describes a plurality of actions performed by the user with the user tool including the action; and receiving from a requesting application a query for data describing the plurality of actions; and sending to the requesting application the data describing the plurality of actions.

19. The medium of claim 18, wherein the action record data comprises timestamp data indicating a time of the action, and wherein the at least one computer readable medium further comprises instructions for determining that a cryptographic signature of the timestamp data was generated by a time server system.

20. The medium of claim 18, wherein the at least one computer readable medium further comprises instructions for:

receiving result data describing a result of the action; and generating a skill level for the action based at least in part on the result data.

21. The medium of claim 18, wherein the at least one computer readable medium further comprises instructions for:

receiving result data describing a result of the action;

generating a skill level for the action based at least in part on the result data;

receiving price data describing a price charged by the user for use of the user tool; and generating a price-to-skill ratio for the user based at least in part on the skill level and the price data.

22. The medium of claim 18; wherein the at least one computer readable medium further comprises instructions for:

generating a viewer interface comprising data describing the plurality of actions; and serving the viewer interface to a viewer computing device.

23. A user tool, comprising:

a user tool sensor positioned to capture first sensor data describing an action of a user taken the user tool;

an authentication circuit to:

receive user identity data from a user;

determine that the user identity data corresponds to the user;

a data receiver circuit to receive sensor data from at least one user tool sensor, the sensor data comprising the first sensor data;

an action inference circuit to determine a time of the action based at least in part on the sensor data;

a record generator circuit to:

generate an action record including at least a portion of the sensor data captured within a threshold time of the action; and encrypt the action record using a private cryptographic key associated with the user tool; and a record sender circuit to send the action record to an aggregating system.

24. The user tool of claim 23, wherein the data receive circuit is also to receive second sensor data from a device associated with the user tool.

* * * * *